Oct. 15, 1968   H. D. BAUMANN   3,405,730
PRESSURE RELIEF VALVE HAVING TUBULAR PLUG
Filed Dec. 20, 1965

HANS D. BAUMANN
INVENTOR.

BY

United States Patent Office 3,405,730
Patented Oct. 15, 1968

3,405,730
PRESSURE RELIEF VALVE HAVING
TUBULAR PLUG
Hans D. Baumann, Decatur, Ill., assignor to A. W. Cash
Company, Decatur, Ill., a corporation of Illinois
Filed Dec. 20, 1965, Ser. No. 514,875
1 Claim. (Cl. 137—510)

ABSTRACT OF THE DISCLOSURE

A pressure relief valve is provided wherein tubular members are employed as both head and seat elements. The tubular head element being positioned against an imperforate diaphragm actuator by a spring and sealed thereto by an O-ring. Such construction provides self-alignment and pressure balancing of the head element with respect to the seat or relief port.

---

This invention relates to a pressure relief valve and, more particularly, to apparatus arranged to be placed in a fluid system to maintain the pressure at a point in the system at a constant value.

It is common practice in the construction of fluid systems to provide a pressure relief valve for regulating the back pressure or for operation as a relief valve against high inlet pressure surges. One of the difficulties experienced in the design of such valves, however, is that the relief port must be of a small size to prevent the dynamic action of the relief pressure upon the valve plug cross-sectional area. Furthermore, these valves are used with a diaphragm and, when this is done, the bolting of the valve plug to the diaphragm makes it possible for leakage to take place through the diaphragm center hole. These and other difficulties experienced with the prior art devices have been obviated in a novel manner by the present invention.

It is, therefore, an outstanding object of the invention to provide a pressure relief valve having a diaphragm with no aperture for fastening the valve plug.

Another object of this invention is the provision of a relief valve which allows the employment of a larger than normal relief port without the operation being affected by the dynamic action of the relief pressure upon the valve plug cross-sectional area.

A further object of the present invention is the provision of a relief valve giving a continuous automatic protection of a fluid system against high inlet pressure surges.

A further object of the present invention is the provision of a pressure relief valve having means for assuring that the valve plug remains in alignment with the valve seat.

It is another object of the instant invention to provide a pressure relief valve which permits access to the internal parts without the necessity of its being removed from the piping system.

It is a further object of the invention to provide a pressure relief valve which permits service and cleaning operations, the installation of spare parts, or the changing from a metal seat to a soft seat trim to be easily performed.

Another object of the invention is to provide a pressure relief valve in which the valve plug is subjected to pressures in equal opposed amounts so that it does not affect the operation of the diaphragm.

With these and other objects in view, as will be apparent to those skilled in the art, the invention resides in the combination of parts set forth in the specification and covered by the claims appended hereto.

Figure 1:
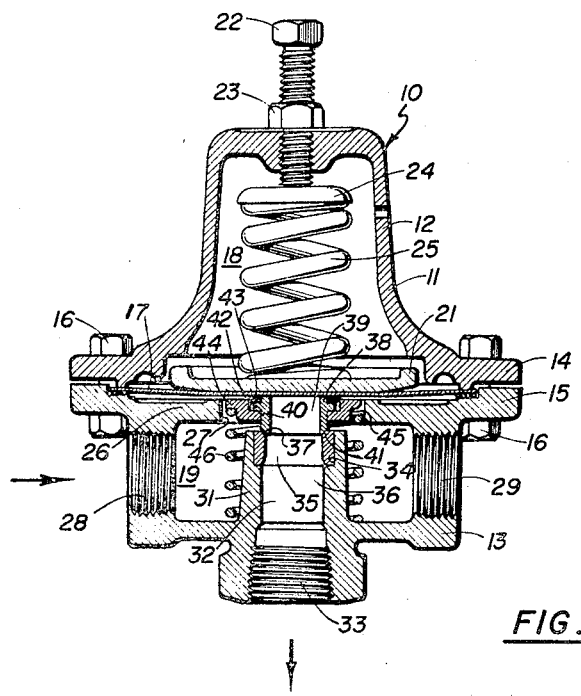
Figure 2:
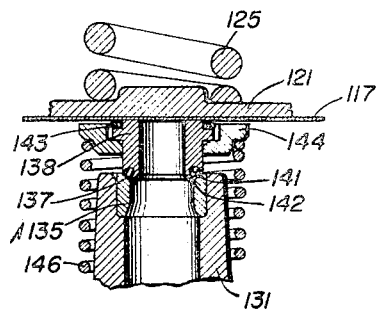

The character of the invention, however, may be best understood by reference to one of its structural forms as illustrated by the accompanying drawings in which:

FIG. 1 is a vertical sectional view of a value embodying the principles of the present invention; and FIG. 2 is an enlarged sectional view of a modified form of the valve.

Referring first to FIG. 1, it can be seen that the pressure relief valve, indicated generally by the reference numeral 10, consists of a housing 11 formed as an upper portion 12 and a lower portion 13 having matching circular flanges 14 and 15, respectively, which are held together by bolts 16. Clamped between the flanges and held by the bolts 16 is a thin metal diaphragm 17 which divides the housing 11 into an upper chamber 18 lying within the upper portion 12 and a lower chamber 19 lying within the lower portion 13. On the upper surface of the diaphragm 17 lies a circular plate 21, which is somewhat dish-like in configuration, with the concave surface facing upwardly. Extending through the upper part of the upper portion 12 coaxially of the flanges 14 and 15 and the diaphragm 17 is an adjusting screw 22 which is provided at the outer surface of the upper portion 12 with a lock nut 23 and provided at its inner lower end with a pressure plate 24 which is of dish-like configuration having its concave portion facing downwardly. Extending between the pressure plate 24 and the plate 21 is a coil spring 25.

The lower portion 13 is of generally circular configuration and is coaxial with the flange 15. Extending inwardly into the chamber 19 adjacent the diaphragm 17 and the flange 15 is a wall 26 and through the center of this wall coaxially of the flange 15 is a vertical bore 27. Underlying the wall 26 is an inlet port 28 and coaxial of this last-named port on the opposite side of the housing is an outlet port 29. Rising from the bottom of the lower portion 13 of the housing into the chamber 19 is a tubular abutment 31 having a vertical bore 32 extending through it coaxially of the flange 15. The lower end of this bore connects with a relief port 33 leading to the exterior of the housing. At the upper portion of the bore 32 it is provided with a counterbore 34 and in this counterbore rests a valve seat 35 having an internal bore 36 of downwardly-flaring venturi conformation. The upper end of the bore 36, however, is provided with a conical bevel 37. Normally resting on this bevel and extending vertically upwardly therefrom is a valve plug 38 in the general form of a tube having a passage or bore 39 extending through it coaxially of the bore 36 of the valve seat. The lower end of the valve plug is provided with a conical bevel 41 which exactly matches the conical bevel 37 of the valve seat 35. Extending outwardly of the plug 38 adjacent the upper end thereof is a radial flange 42 and resting on top of this flange and extending between the flange and the bottom surface of the diaphragm 17 is an O-ring 43 formed of an elastomer substance, such as Teflon.

Lying in the bore 27 is a retaining ring 44 of dish-like conformation having its concavity facing upwardly toward the diaphragm 17. In the center of the bottom of the retaining ring is a bore 40 in which is carried the outer cylindrical surface of the valve plug 38, the bottom surface of the flange 42 resting on the upper surface of the bottom of the retaining ring. Formed on the undersurface of the retaining ring is an annular groove 45 and in this groove lies one end of a coil spring 46, the other end of which rests against the bottom of the lower portion 13 of the housing, while the coil spring extends around the abutment 31.

It should be noted that the retaining ring 44 is provided with an outer cylindrical surface which is considerably smaller in diameter than the diameter of the bore 27 in the wall 26. The retaining ring 44, therefore, is movable laterally of the axis of the bores 39 and 36 and considerable space is provided for fluid pressure from the chamber 19 to make itself felt through the gap between the bore 27 and the ring 44 and on the surface of the diaphragm 17.

The operation of the invention will now be readily understood in view of the above discussion. Fluid pressure from a source, such as a pump, enters the valve through the inlet port 28. The fluid flows through the chamber 19 around the abutment 31 and leaves through the outlet port 27. The pressure of fluid in the chamber 19 operates through the gap between the bore 27 in the wall 26 and the retaining ring 44 to act on the diaphragm 17. This upward pressure is counteracted by the downward pressure of the coil spring 25 whose compression has been regulated by means of the adjusting screw 22. On occasion, the pressure entering the valve through the inlet port 28 exceeds a predetermined value, so that the pressure operating on the bottom of the diaphragm 17 overcomes the spring pressure exerted by the spring 25. At that time, the center of the diaphragm will move upwardly permitting the coil spring 36 to push the retaining ring 44 upwardly along with the diaphragm.

The upward movement of the retaining ring 44 carries the value plug 39 upwardly also, since the retaining ring contacts the flange 42 and presses it at all times tightly toward the bottom surface of the diaphragm. It will be understood that the upper end of the valve plug does not actually contact the diaphragm 17 because of the presence of the O-ring 43. As a matter of fact, a substantial gap remains between the upper end of the valve plug and the diaphragm. The movement of the diaphragm and the valve plug upwardly, however, separates the conical bevel 41 of the valve plug from the conical bevel 37 of the valve seat and the gap exists between them. This allows fluid to flow from the chamber 19 through the gap thus formed through the bore 36 of the valve seat and the bore 32 of the abutment 31 to the relief port 33 to disposal. The contact between the bevel 41 and the bevel 37 causes, if they are not exactly aligned, a certain lateral pressure on the retaining ring and the valve plug 39. Since they are unrestricted in the lateral direction, except for the friction forces, the retaining ring and the valve plug can move laterally until the plug and the valve seat are in exact alignment. This operates during the life of the valve to assure that the valve plug and the valve seat are in exact alignment at all times.

It will be appreciated that the downstream pressure which appears at the relief port 33 also makes itself felt not only on the surface of the diaphragm 17 but also appears in the gap between the upper end of the valve plug 38 and the diaphragm. It operates on an area there equal to the thickness of the valve plug. The downstream pressure also acts on the lower end of the valve plug but, of course, is proportional to the projected area of the bevel 41. These two projected areas are, of course, equal so that the pressure exactly balances on either end of the plug. This prevents the "bathtub stopper" effect usually found in such valves; in the past, the rush of fluid down the relief passage through the valve seat has caused a sucking action on the valve plug so that it operates in an erratic manner and its opening and closing is not truly representative of the range of pressures desired to be regulated.

Referring to FIG. 2, it can be seen that a diaphragm 117 has a plate 121 lying on its upper surface and pressed downwardly by a coil spring 125. The retaining ring 144 holds the value plug 138 in place. The valve plug contacts the abutment 131 carrying the valve seat 135, while a coil spring 146 holds the retainer 144 and the valve plug 138 in an upward direction, the contact between the valve plug 138 and the diaphragm 117 taking place through an O-ring 143. In this modified version of the invention, the valve seat, as before, is provided with a conical bevel 137, while the lower end of the valve plug, instead of being provided with a conical surface to contact the valve seat, is provided with an annular groove 141 in which is locked an O-ring 142 formed of an elastomer substance, such as Teflon. The groove 141 is circular annular in construction and covers more than 180° so that the O-ring 142 is locked in place.

It can be seen that the present valve represents an entirely new approach to a continuous automatic protection of fluid systems against high inlet pressure surges. It gives excellent pressure stability in close control due to its unique pressure-balanced trim design. This trim design allows the employment of a larger than normal relief port without the operation being affected by dynamic action of the relief pressure upon the valve plug cross-sectional area. In addition to providing a constant off-balance area for the inlet pressure, the design assures perfect self-alignment and ease of maintenance. The need for the usual bolting of the valve plug to the diaphragm is eliminated and this removes the possibility of leakage through a diaphragm center hole. At the same time, it assures positive reaction to the slightest change in pressure. The construction of the valve permits access to the internal parts without requiring its removal from the piping system. Consequently, servicing, cleaning, and the installation of spare parts, or the changing from metal seat (FIG. 1) to soft seat (FIG. 2), or the replacement of only one part is quickly performed. The valve is suitable for use in steam, air, oil, water, gas and many other fluid systems.

A rise in the inlet pressure above the set point forces the diaphragm up and overcomes the range spring pressure. At the same time, the valve plug spring (which is under constant compression keeping the valve plug in contact with the diaphragm) opens the valve and the excess fluid can be exhausted.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A pressure regulating valve, comprising:
   (a) a housing having inlet, outlet, and relief ports,
   (b) a diaphragm extending across the housing and dividing the housing into two chambers, the ports all residing in one of the chambers, the housing being provided with a wall extending generally parallel to the diaphragm and having a bore,
   (c) a valve seat mounted in the housing coaxially of the diaphragm and of the said bore and having access to the relief port,
   (d) a tubular plug aligned with and mating with the valve seat at one end and lying adjacent the diaphragm at the other end, the plug being provided with a radial flange forming an annular recess facing toward the surface of the diaphragm and carrying an elastomer O-ring which bears against the said surface, (e) a dish-shaped retainer supporting the plug and residing in the said bore, the retainer having a concavity facing toward the diaphagm and a bore extending through its center, the radial flange of the plug residing in the concavity of the retainer with one radial surface of the flange contacting the surface of the retainer surrounding the bore, and (f) a coil spring located coaxially of the valve seat and extending between the housing and the retainer, the retainer having an annular groove in which the end of the spring resides.

References Cited

UNITED STATES PATENTS

| 2,074,268 | 3/1937 | Lowe | 137—510 XR |
| 2,585,575 | 2/1952 | Nedergaard et al. | 137—510 |
| 2,678,187 | 5/1954 | Peters. | |
| 2,722,398 | 11/1955 | Strid | 251—282 XR |
| 2,847,258 | 8/1958 | Burdick | 137—510 XR |
| 3,175,473 | 3/1965 | Boteler | 251—331 XR |

FOREIGN PATENTS 424,918   9/1947   Italy.

WILLIAM F. ODEA, *Primary Examiner.*